US012454843B2

(12) United States Patent
Thomas, Sr.

(10) Patent No.: US 12,454,843 B2
(45) Date of Patent: Oct. 28, 2025

(54) SAFETY ENCLOSURE BUILDING SYSTEM

(71) Applicant: Kevin B. Thomas, Sr., Cullman, AL (US)

(72) Inventor: Kevin B. Thomas, Sr., Cullman, AL (US)

( * ) Notice: Subject to any disclaimer, the term of this patent is extended or adjusted under 35 U.S.C. 154(b) by 136 days.

(21) Appl. No.: 18/131,067

(22) Filed: Apr. 5, 2023

(65) Prior Publication Data

US 2024/0133203 A1 Apr. 25, 2024
US 2024/0229494 A9 Jul. 11, 2024

Related U.S. Application Data

(60) Provisional application No. 63/417,879, filed on Oct. 20, 2022.

(51) Int. Cl.

| | |
|---|---|
| ***E04H 9/06*** | (2006.01) |
| ***E04B 1/344*** | (2006.01) |
| ***E04B 2/82*** | (2006.01) |
| ***E06B 5/10*** | (2006.01) |
| ***F41H 5/24*** | (2006.01) |

(52) U.S. Cl.
CPC ............. *E04H 9/06* (2013.01); *E04B 1/3445* (2013.01); *E04B 2/827* (2013.01); *E06B 5/10* (2013.01); *F41H 5/24* (2013.01)

(58) Field of Classification Search
CPC ......... E04H 9/06; E04B 1/3445; E04B 2/827; E06B 5/10; F41H 5/24
See application file for complete search history.

(56) References Cited

U.S. PATENT DOCUMENTS

| | | | | |
|---|---|---|---|---|
| 8,640,389 | B2 | 2/2014 | Battenfield | |
| 9,354,619 | B2 | 5/2016 | Ergenbright et al. | |
| 9,435,147 | B1 | 9/2016 | Giandomenico, Jr. et al. | |
| 9,675,720 | B2 * | 6/2017 | Romo | A61L 9/20 |
| 10,125,486 | B1 * | 11/2018 | Handley | F41H 5/18 |
| 10,942,011 | B1 | 3/2021 | Zea | |
| 11,029,133 | B2 * | 6/2021 | Larson | F41H 5/04 |
| 11,142,903 | B1 * | 10/2021 | Jones, Jr. | E04B 2/7405 |
| 11,402,178 | B2 | 8/2022 | Batiste et al. | |
| 11,828,059 | B2 * | 11/2023 | Klein | F41H 5/013 |
| 2016/0281416 | A1 | 9/2016 | Spransy | |
| 2016/0332718 | A1 * | 11/2016 | Guering | B64D 45/0028 |
| 2017/0089122 | A1 * | 3/2017 | Lewis | E06B 3/481 |
| 2019/0360782 | A1 | 11/2019 | Blackburn | |
| 2020/0002983 | A1 | 1/2020 | Breland | |
| 2020/0018572 | A1 * | 1/2020 | Gonzales | F41H 5/24 |
| 2020/0248990 | A1 * | 8/2020 | Larson | F41H 11/08 |

(Continued)

*Primary Examiner* — Jessie T Fonseca
(74) *Attorney, Agent, or Firm* — Olav M. Underdal; IDP Patent Sevices

(57) ABSTRACT

A safety enclosure building system, includes a first wall panel that is rotatably mountable to a first wall, and a second wall panel that is rotatable and slidably mountable to a second wall; such that the wall panels are configured to prevent penetration of a projectile of a firearm; such that the safety enclosure building system is configured to be positioned in a folded-in configuration in a corner between the first wall and the second wall; and such that the safety enclosure building system is configured to be folded out to a folded-out configuration, such that the folded-out configuration can enable students to seek safety in a safe interior behind the safety enclosure building system.

25 Claims, 18 Drawing Sheets

(56) References Cited

U.S. PATENT DOCUMENTS

| | | | | |
|---|---|---|---|---|
| 2022/0018635 | A1 | 1/2022 | Ahle et al. | |
| 2023/0392904 | A1* | 12/2023 | Gozzola, Sr. | F41H 5/06 |
| 2023/0408226 | A1* | 12/2023 | Giordano | F41H 5/013 |

* cited by examiner

Safety Enclosure System

SAFETY ENCLOSURE BUILDING SYSTEM

CROSS-REFERENCE TO RELATED APPLICATIONS

This application claims the benefit of U.S. Provisional Application No. 63/417,879, filed Oct. 20, 2022; which is hereby incorporated herein by reference in its entirety.

FIELD OF THE INVENTION

The present invention relates generally to the field of safety systems to protect against active shooters, and more particularly to methods and systems for a safety enclosure for use in schools and similar environments.

BACKGROUND OF THE INVENTION

School shootings and shootings in public and corporate buildings have become a growing concern in recent years.

Although there has been considerable public discussion on solutions to mitigate and prevent this serious societal problem, few if any viable solutions have gained support by politicians and the general public.

As such, considering the foregoing, it may be appreciated that there continues to be a need for novel and improved devices, systems, and methods to protect against active shooters.

SUMMARY OF THE INVENTION

The foregoing needs are met, to a great extent, by the present invention, wherein in aspects of this invention, enhancements are provided to the existing models for protection against active shooters.

In an aspect, a safety enclosure building system can include:

a) a first wall panel, which is rotatably mounted to a first wall; and b) a second wall panel, which is slidably and rotatably mounted to a second wall;

wherein the first wall panel and the second wall panel are each configured to prevent penetration of a projectile of a firearm;

wherein a first inner vertical end of the first wall panel is rotatably connected to a second inner vertical end of the first wall panel;

such that the safety enclosure building system is configured to be positioned in a folded-in configuration in a corner between the first wall and the second wall, wherein the folded-in configuration permits space saving storage for example in a classroom or other room of a building; and such that the safety enclosure building system is configured to be folded out to a folded-out configuration, such that the folded-out configuration can enable students to seek safety in the opening behind the safety enclosure building system.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1A:
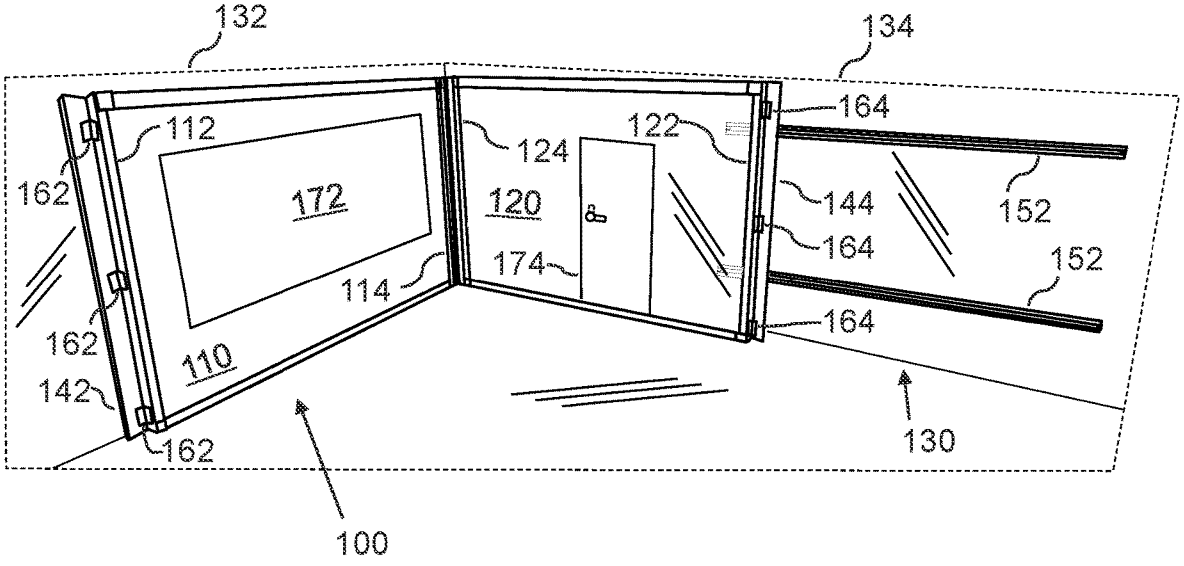
FIG. 1A is a perspective view of a safety enclosure building system in a folded-in configuration, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a safety enclosure building system 100 with reference to FIGS. 1A-1E, in such manner that like reference numerals refer to like components throughout; a convention that we shall employ for the remainder of this specification.

Figure 1B:
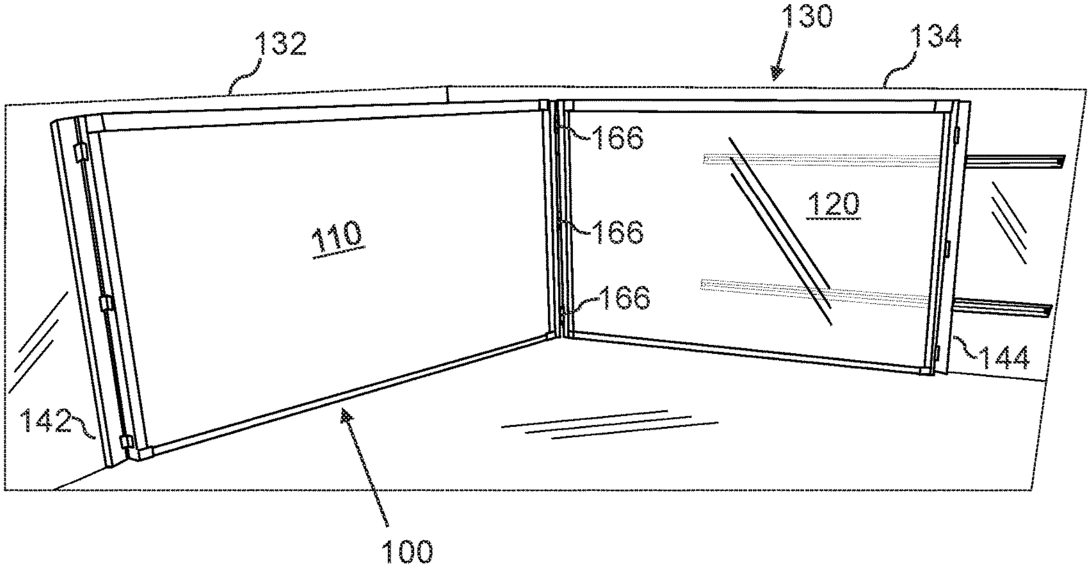
FIG. 1B is a perspective view of a safety enclosure building system in a first partially folded-out configuration, according to an embodiment of the invention.
Figure 1C:
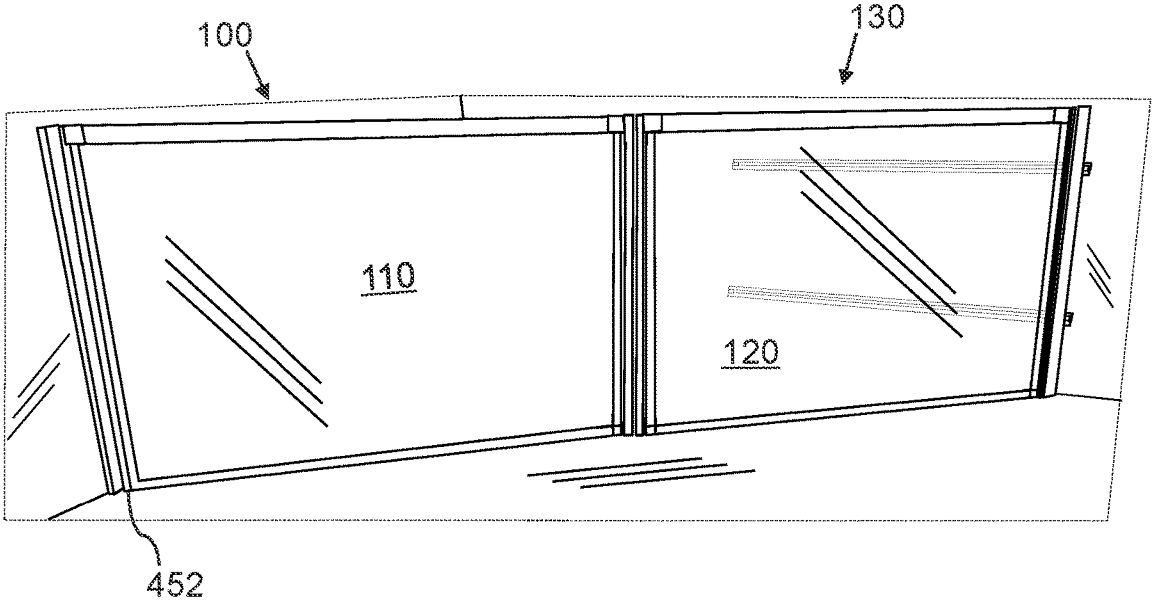
FIG. 1C is a perspective view of a safety enclosure building system in a second partially folded-out configuration, according to an embodiment of the invention.
Figure 1D:
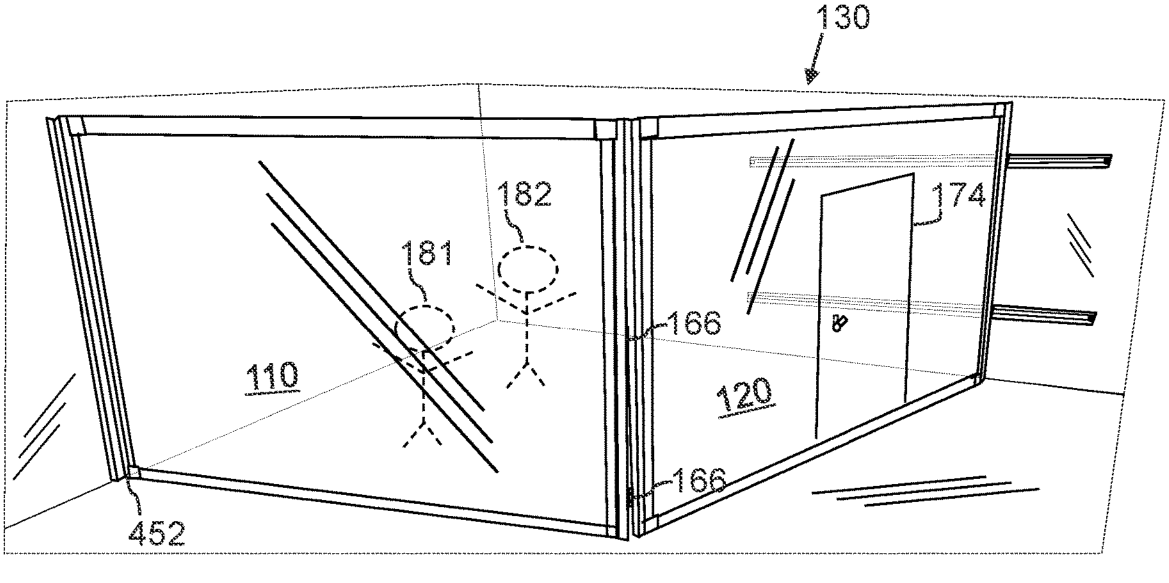
FIG. 1D is a perspective view of a safety enclosure building system in a third partially folded-out configuration, according to an embodiment of the invention.
Figure 1E:
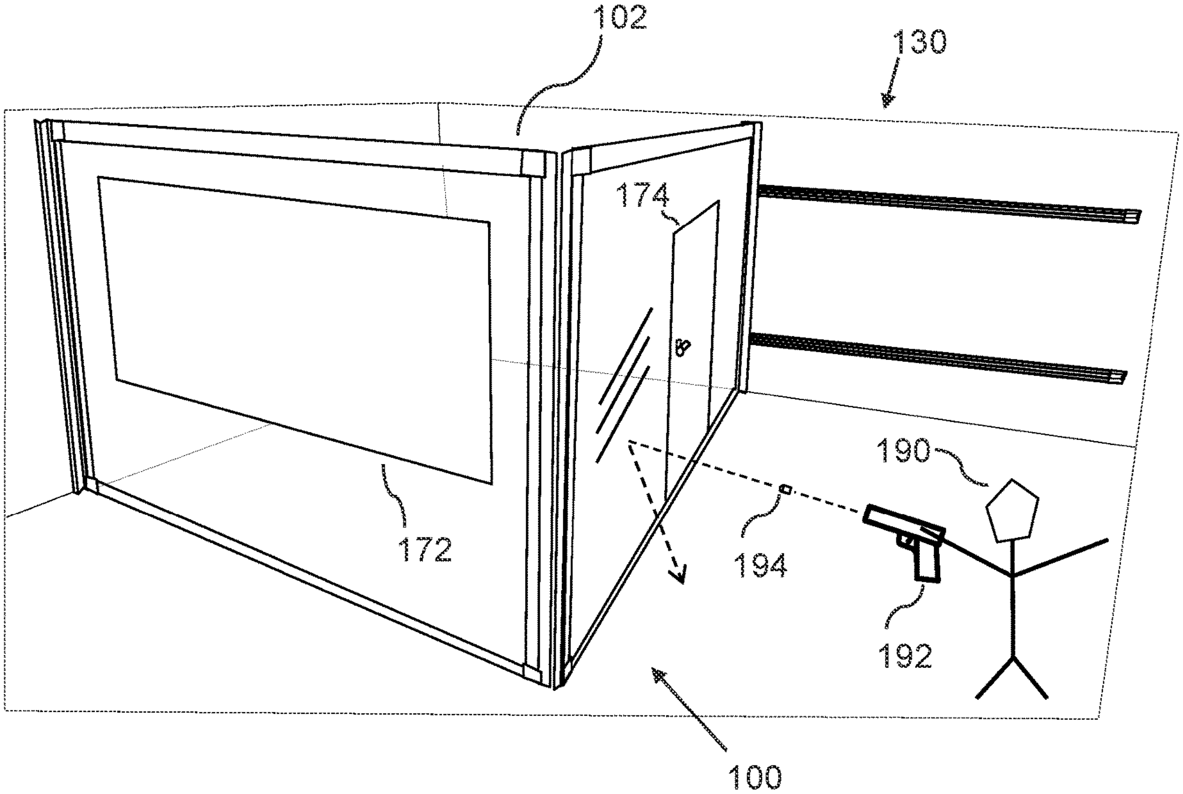
FIG. 1E is a perspective view of a safety enclosure building system in a fully folded-out configuration, according to an embodiment of the invention.

In an embodiment, as shown in FIGS. 1A-1E, a safety enclosure building system 100 can include:

a) a first wall panel 110, wherein a first outer vertical end 112 of the first wall panel 110 is rotatably mounted to a first wall 132; and b) a second wall panel 120, wherein a second outer vertical end 122 of the second wall panel 120 is slidably and rotatably mounted to a second wall 134;

wherein the first wall panel 110 and the second wall panel 120 are each configured to prevent penetration of a projectile 194 of a firearm 192 fired by a shooter 190, as shown in FIG. 1E;

wherein a first inner vertical end 114 of the first wall panel 110 is rotatably connected to a second inner vertical end 124 of the second wall panel 120;

such that the safety enclosure building system 100 is configured to be positioned in a folded-in configuration in a corner between the first wall 132 and the second wall 134, as shown in FIG. 1A, such that the folded-in configuration permits space saving storage for example in a classroom or other room of a building; and such that the safety enclosure building system 100 is configured to be folded out (as shown in FIGS. 1B, 1C, and 1D) to a folded-out configuration in the corner between the first wall 132 and the second wall 134, as shown in FIG. 1E, such that the folded-out configuration can enable students 181, 182 to seek safety in a safe interior 102 behind the safety enclosure building system 100, wherein the safe interior 102 is formed between the first and second wall panels 110, 120 and the first and second walls 132, 134.

Figure 7A:
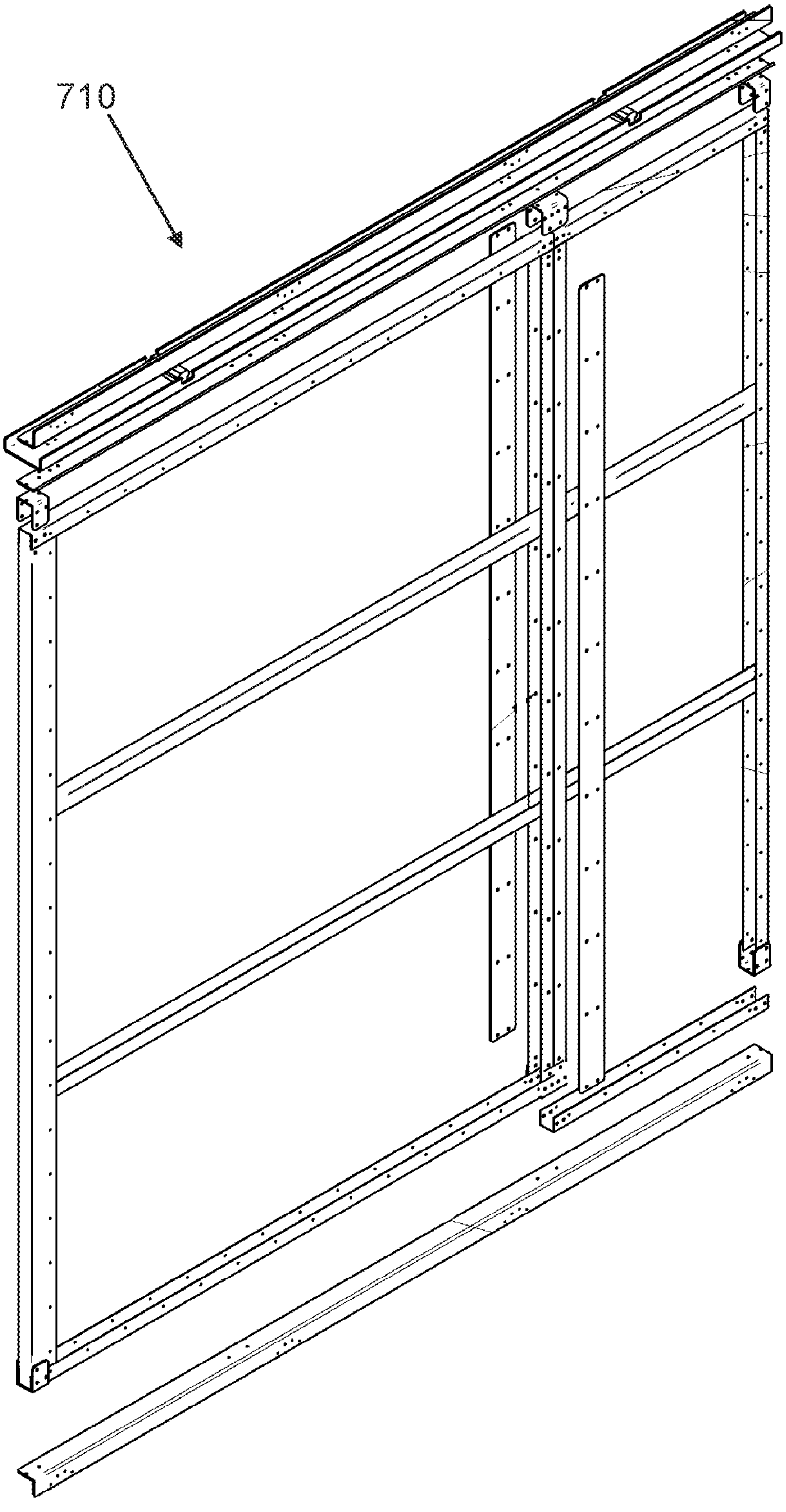
FIG. 7A is a bottom exploded perspective view of a frame assembly of a wall panel of a safety enclosure building system, according to an embodiment of the invention.
Figure 7B:
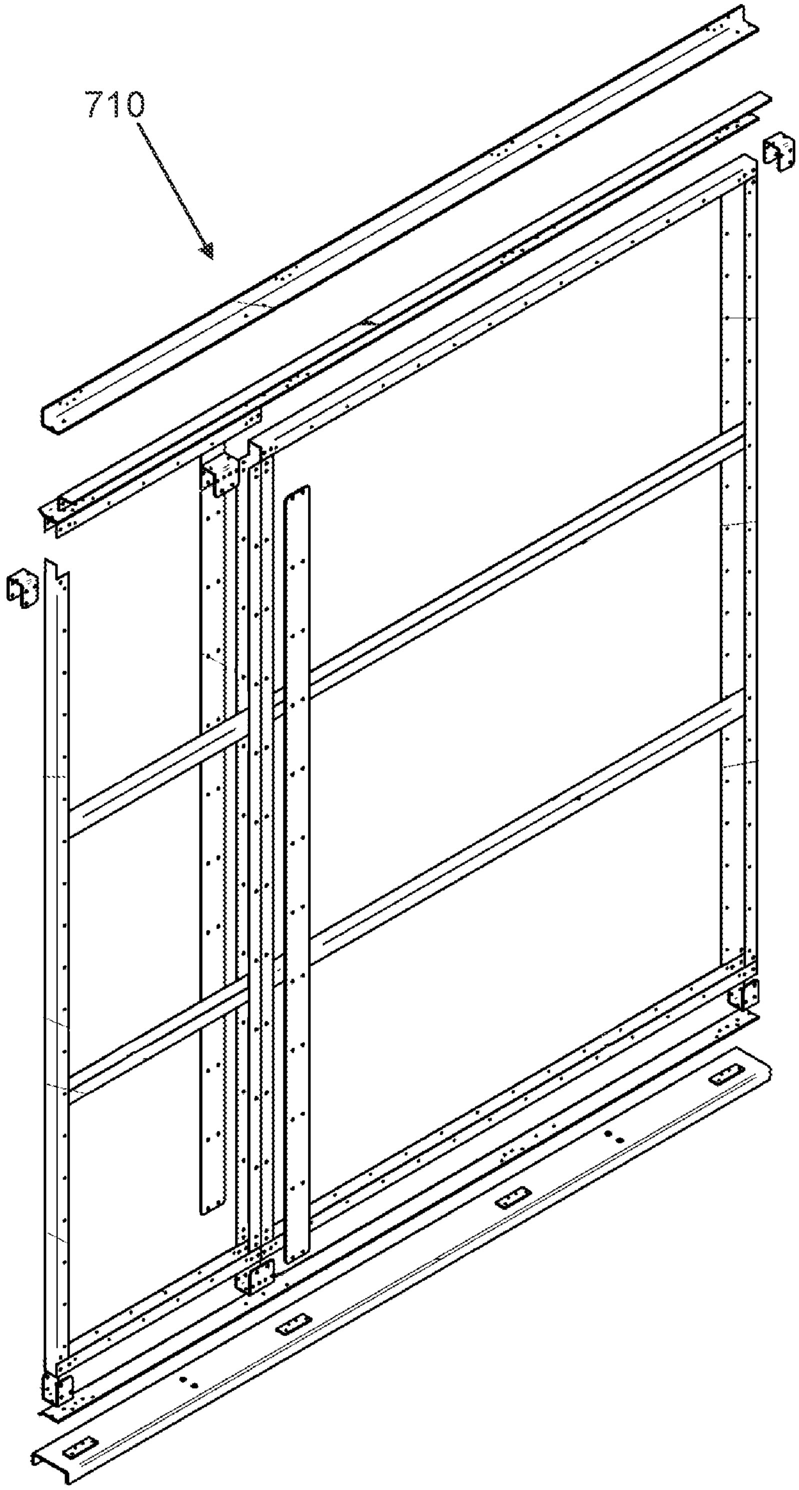
FIG. 7B is a bottom exploded perspective view of a frame assembly of a wall panel of a safety enclosure building system, according to an embodiment of the invention.
Figure 8:
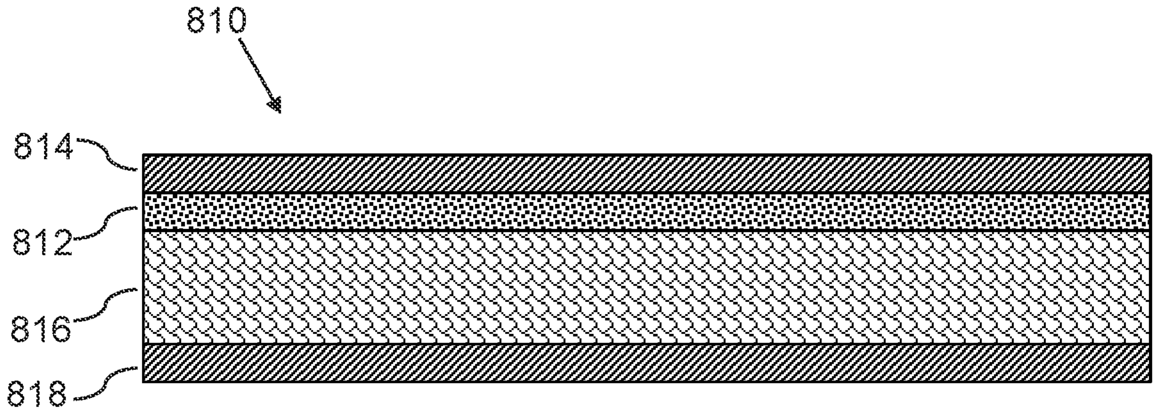
FIG. 8 is a schematic cross-sectional view of a safety enclosure panel assembly of a safety enclosure building system, according to an embodiment of the invention.

In a related embodiment, each of the wall panels 110, 120 can further include:

a) a panel assembly 810, as shown in FIG. 8; and b) a frame assembly 710, as shown in FIGS. 7A and 7B, which can be a first frame assembly 118 or a second frame assembly 128 of the first and second wall panels 110, 120, respectively;

such that the panel assembly 810 is supported by and held in place by the frame assembly 710.

In a related embodiment, as shown in FIGS. 1A and 1E, the safety enclosure building system 100 can further include:

a) at least one whiteboard 172, which is mounted on an outer surface of a selected wall panel 110, 120 of the safety enclosure building system 100;

such that the at least one whiteboard 172 is usable when the safety enclosure building system 100 is positioned in the folded-in configuration (as shown in FIG. 1A).

Figure 5A:
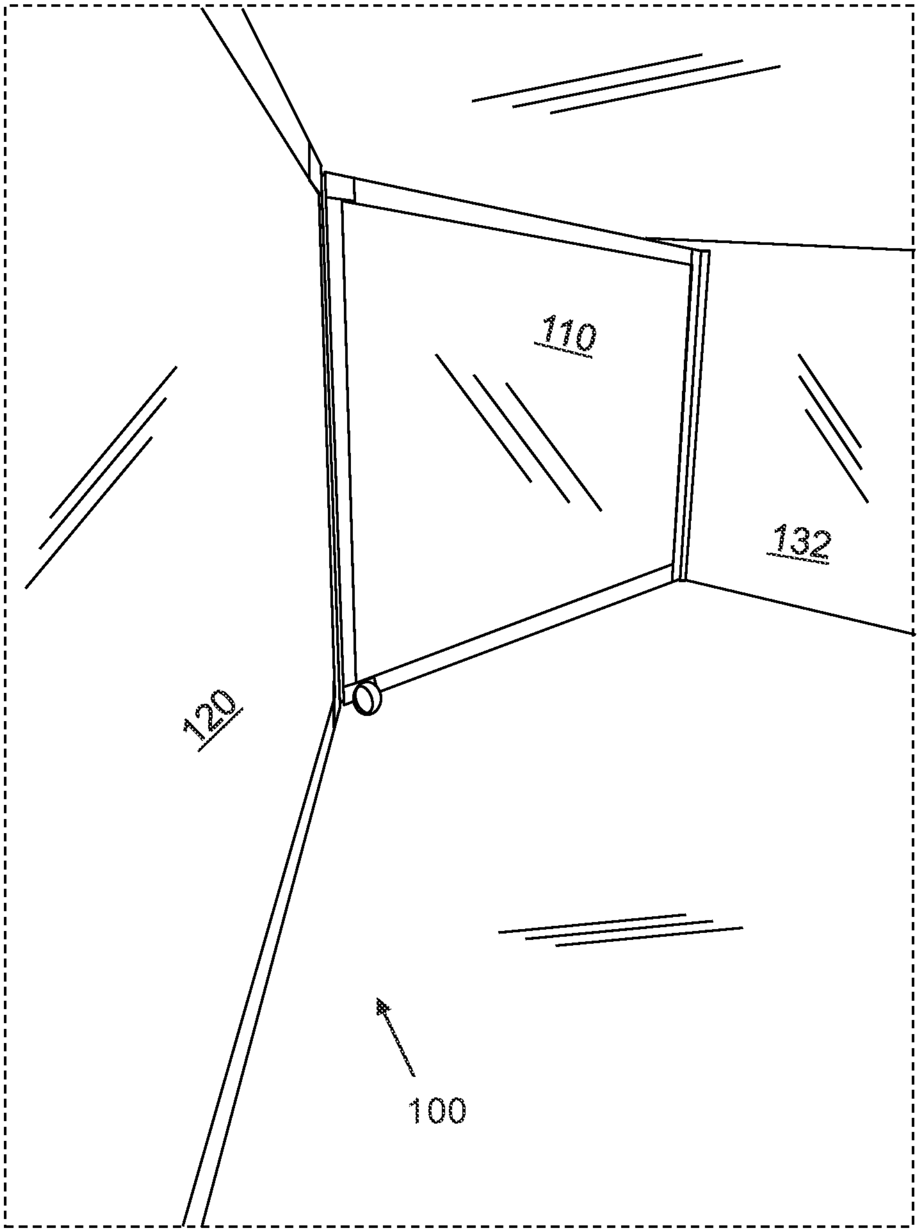
FIG. 5A is an inner side perspective view of a portion of a safety enclosure building system in a partially folded-out configuration, according to an embodiment of the invention.
Figure 5B:
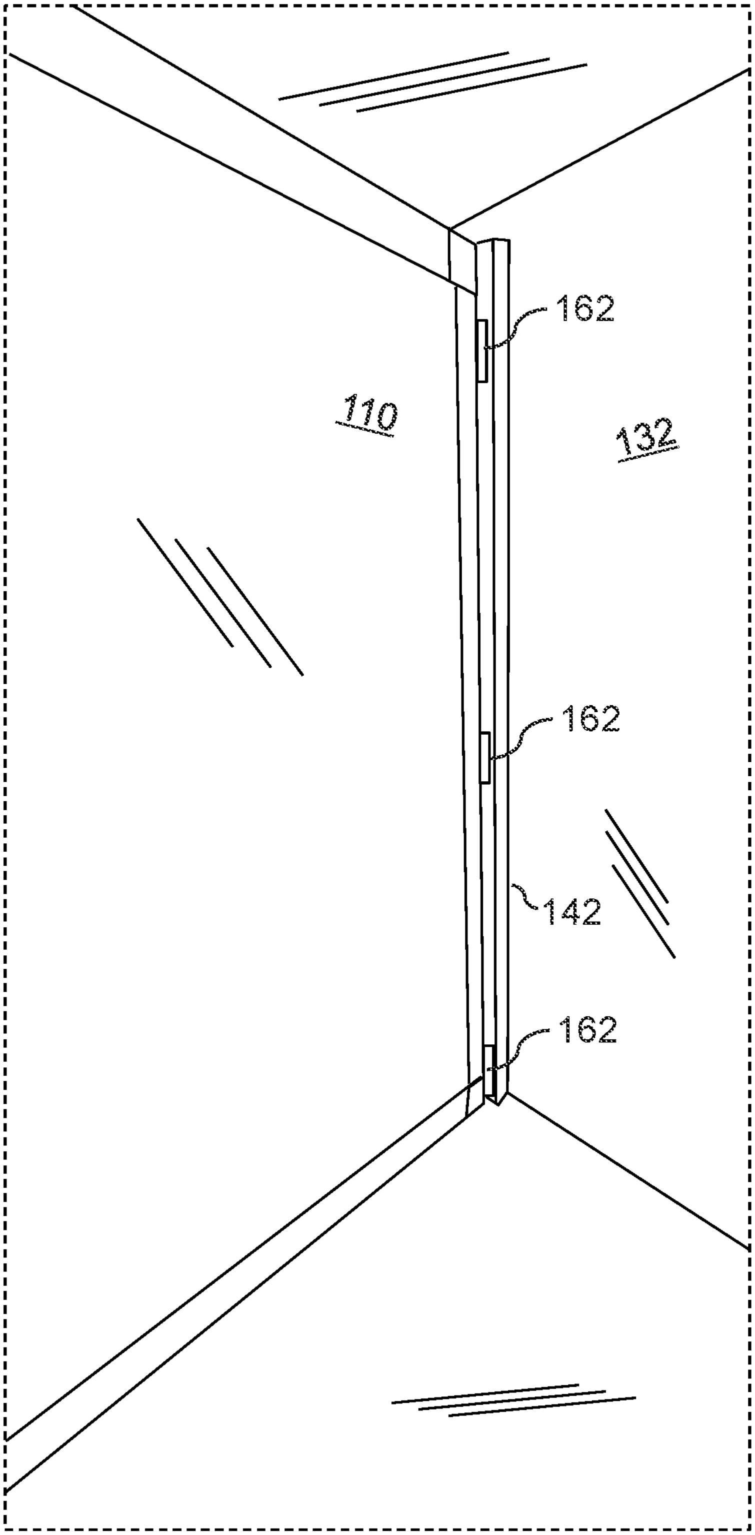
FIG. 5B is a perspective view of a portion of a safety enclosure building system, according to an embodiment of the invention.
Figure 5C:
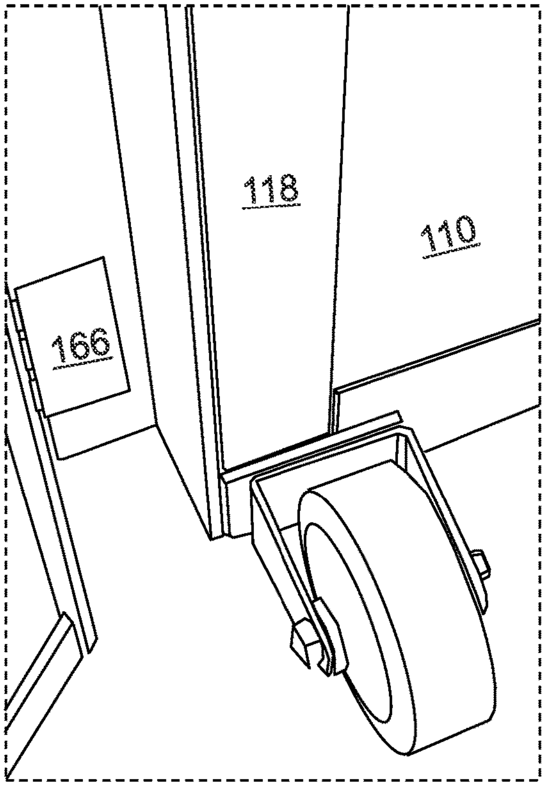
FIG. 5C is a perspective view of a portion of a safety enclosure building system, according to an embodiment of the invention.
Figure 5D:
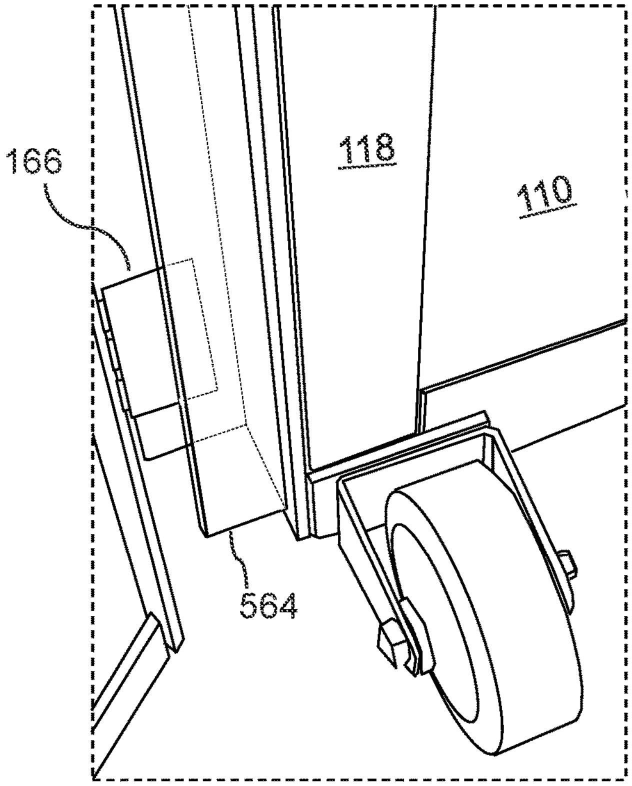
FIG. 5D is a perspective view of a portion of a safety enclosure building system, according to an embodiment of the invention.
Figure 5E:
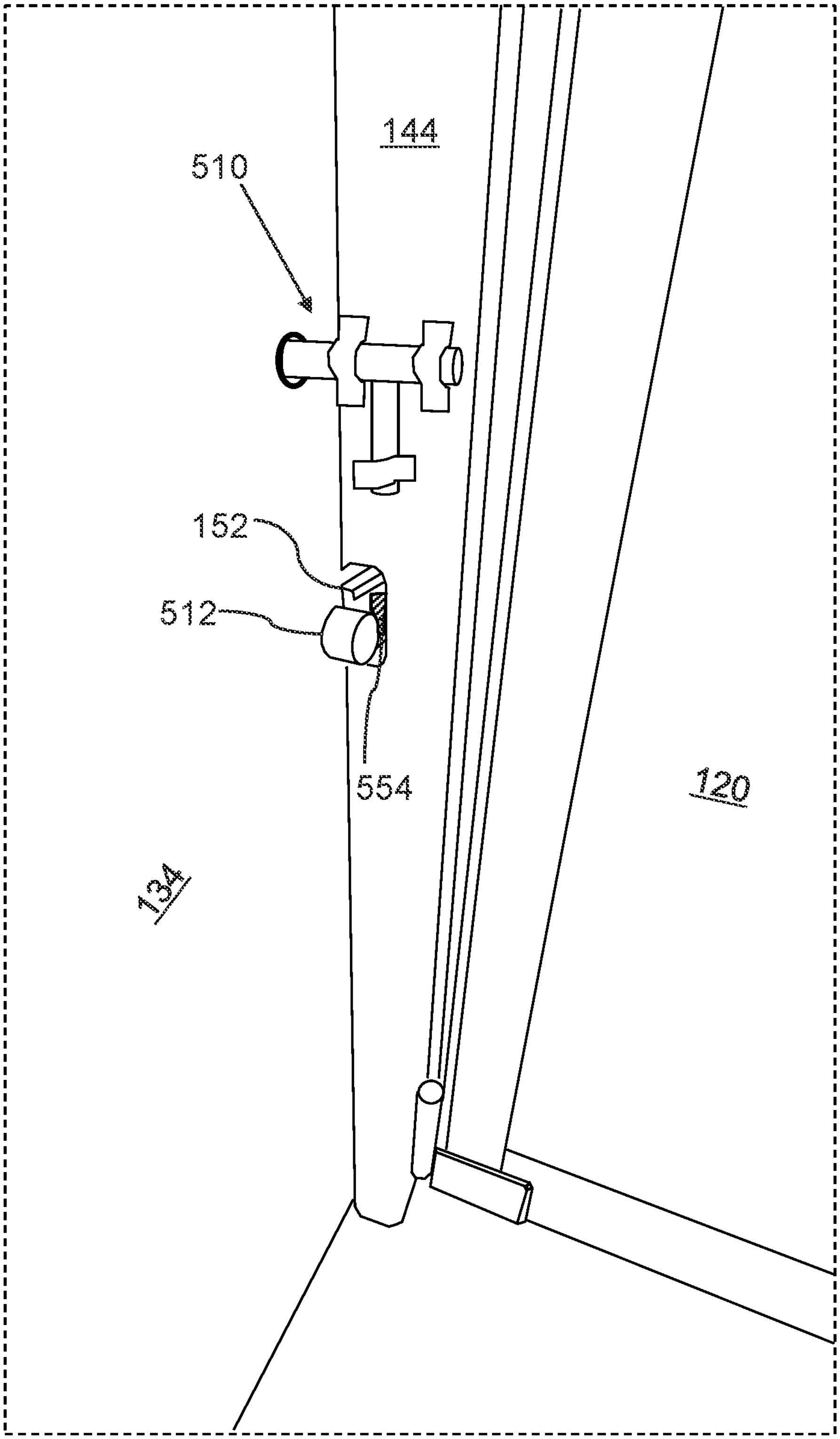
FIG. 5E is a perspective view of a portion of a safety enclosure building system, according to an embodiment of the invention.
Figure 6:
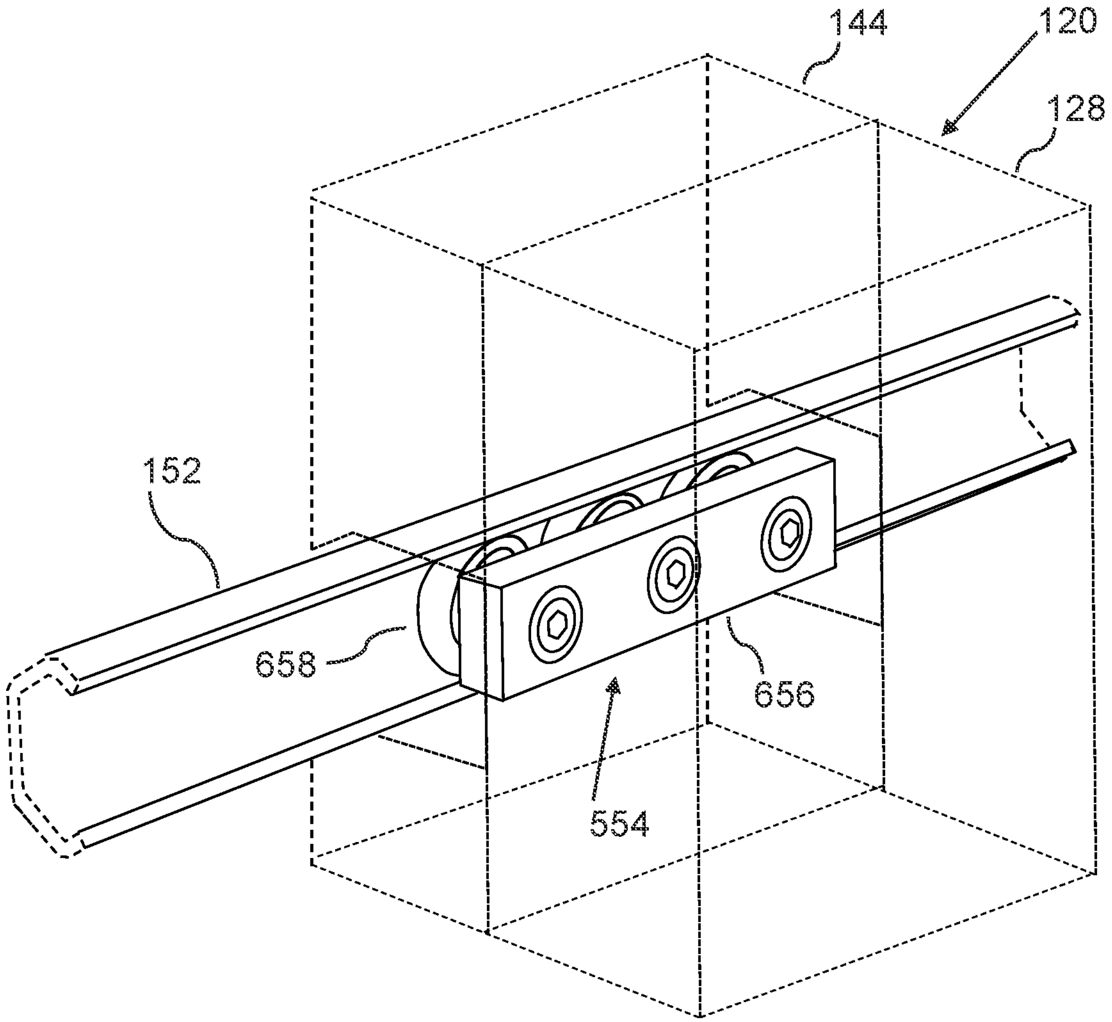
FIG. 6 is a perspective view of a guide rail with a slidable connector mounted on a portion of a safety enclosure building system, according to an embodiment of the invention.

In another related embodiment, as shown in FIGS. 1A, 5E, and 6, the safety enclosure building system 100 can further include:

a) at least one guide rail 152, which is configured to be mounted on a surface of the first wall; and b) at least one slidable connector 554, which is connected to the at least one guide rail 152, such that the at least one slidable connector 554 is configured to be slidable along the at least one guide rail 152, which can include:

i. a slider body 656; and ii. a plurality of rotatable rollers 658, which are each rotatably connected to an inner side of the slider body 656;

wherein the at least one guide rail 152 is configured with a cross-sectional c-shape, such that each rotatable roller 658 in the plurality of rotatable rollers 658 is configured to roll inside the at least one guide rail 152;

wherein the second outer vertical end 122 of the second wall panel 120 is connected to the slider body 656 of the at least one slidable connector 554 (via the vertical sliding column 144).

In another related embodiment, each guide rail 152 can be a roll formed rail, such as a COMMERCIAL RAIL™ linear guide manufactured by PBC LINEAR™, such as the CR45 COMMERCIAL RAIL™ linear guide.

In another related embodiment, each slidable connector 554 can be a roller assembly comprising a slider body with a plurality of rotatably connected steel rollers, such as a roller assembly manufactured by PBC LINEAR™, such as the CR45 COMMERCIAL RAIL™ 3-roller slide assembly.

Figure 2A:
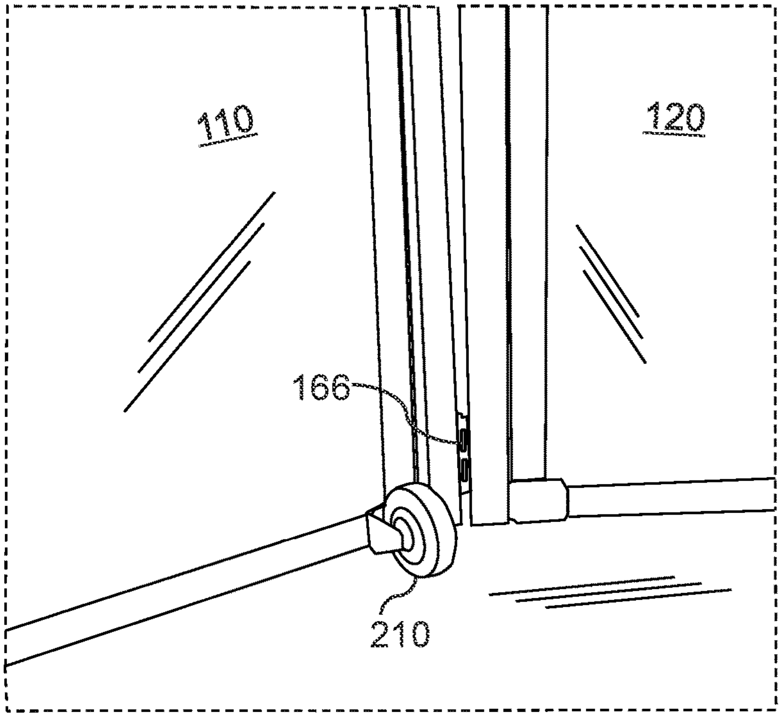
FIG. 2A is a perspective view of a portion of a safety enclosure building system, according to an embodiment of the invention.
Figure 2B:
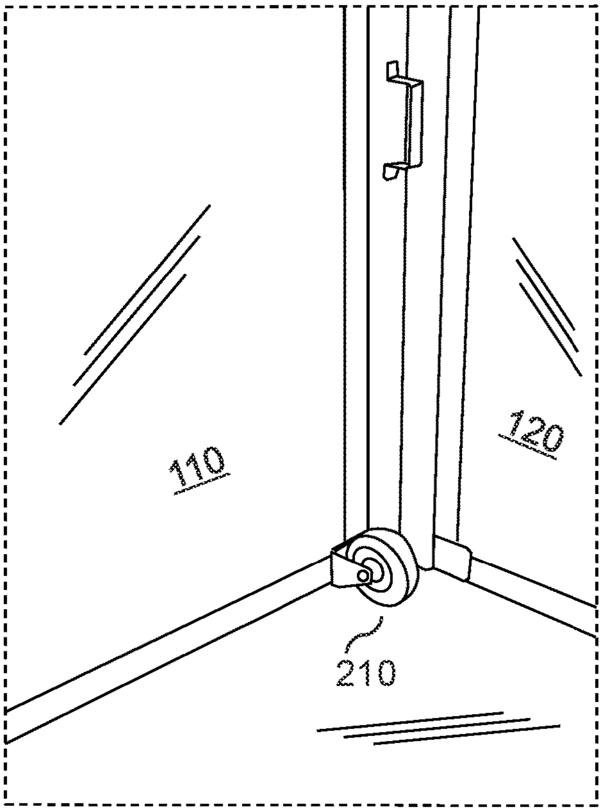
FIG. 2B is a perspective view of a portion of a safety enclosure building system, according to an embodiment of the invention.

In yet a related embodiment, as shown in FIGS. 2A and 2B, the safety enclosure building system 100 can further include:

a) at least one panel roller 210, which is mounted on lower end of a selected wall panel 110, 120 of the safety enclosure building system 100;

such that the at least one panel roller 210 is configured to be rotatable, such that the at least one panel roller 210 supports the selected wall panel 110, 120 during opening and closing of the safety enclosure building system 100.

Figure 3:
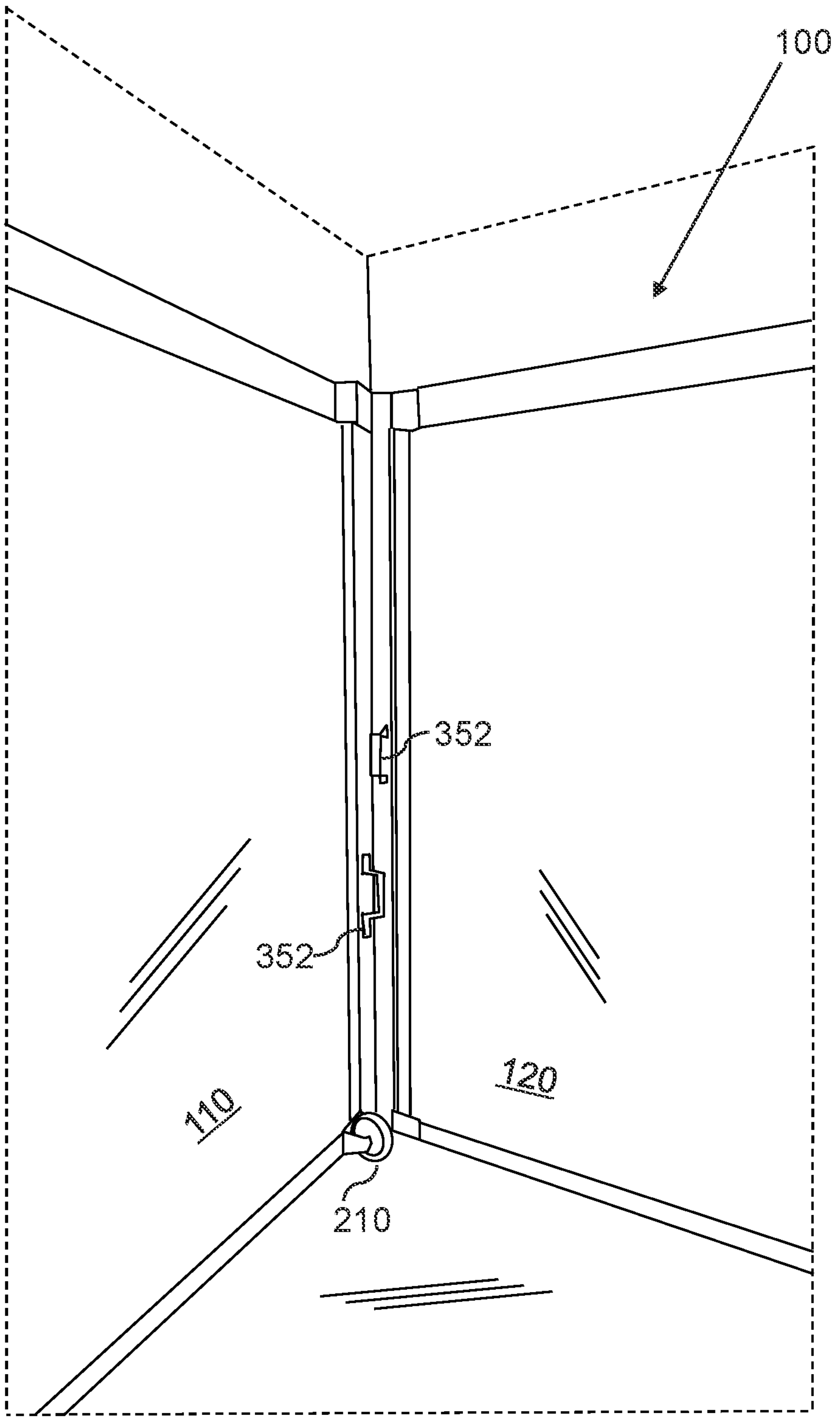
FIG. 3 is a perspective view of a portion of a safety enclosure building system, according to an embodiment of the invention.

In yet another related embodiment, as shown in FIG. 3, the safety enclosure building system 100 can further include:

a) at least one central handle 352, which is configured to be mounted on a corresponding inner vertical end 114, 124 of a selected wall panel 110, 120 of the safety enclosure building system 100;

such that the at least one central handle 352 can facilitate opening and closing of the safety enclosure building system 100.

In a related embodiment, as shown in FIGS. 1A-1E and 4A, the safety enclosure building system 100 can further include:

a) a vertical stationary column 142, which is connected to the first wall 132;

such that a first outer vertical end 112 of the first wall panel 110 is rotatably connected to the vertical stationary column 142;

b) a vertical sliding column 144, which is slidably connected to the at least one guide rail 152;

such that the vertical sliding column 144 can be connected to the slider body 156 of the at least one slidable connector 554;

such that the second outer vertical end 122 of the second wall panel 120 is rotatably connected to the vertical sliding column 144, for example via at least one second outer hinge 164, such that the first outer vertical end 112 of the first wall panel 110 is hingedly connected to the vertical sliding column 144.

In yet another related embodiment, as shown in FIGS. 1A-1B, 1D, and 5C-5D, the safety enclosure building system 100 can further include:

a) at least one central hinge 166;

such that the first inner vertical end 114 of the first wall panel 110 can be rotatably connected to the second inner vertical end 124 of the second wall panel 120 via the at least one central hinge 166, such that the first inner vertical end 114 of the first wall panel 110 is hingedly connected to the second inner vertical end 124 of the second wall panel 120.

In a related embodiment, central and outer hinges 166, 410 can be CAL-ROYAL™ BB52454 Full Mortise Heavy Weight Four Ball Bearing Hinges, manufactured by CAL-ROYAL™.

Figure 4A:
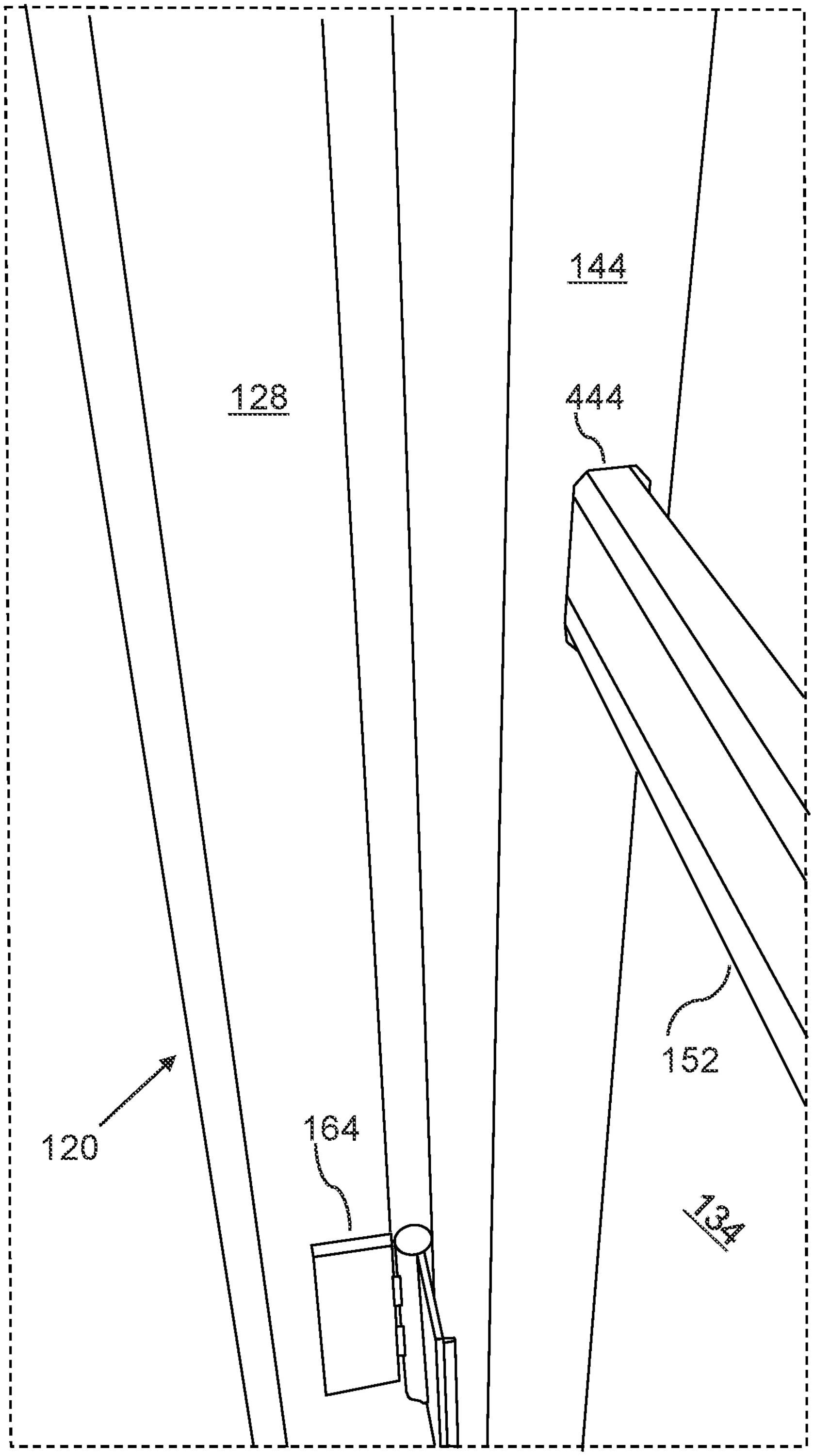
FIG. 4A is a right side perspective view of a portion of a safety enclosure building system in a folded-in configuration, according to an embodiment of the invention.

In a further related embodiment, as shown in FIG. 4A, a rear side of vertical sliding column 144 can be configured with a cutout 444, such that the cutout 444 is configured to receive the at least one guide rail 152, such that the vertical sliding column 144 can slide along the at least one guide rail 152, such that a rear vertical side of the vertical sliding column 144 is directly adjacent to (i.e., in relatively close proximity to) the corresponding second wall 134.

Figure 4B:
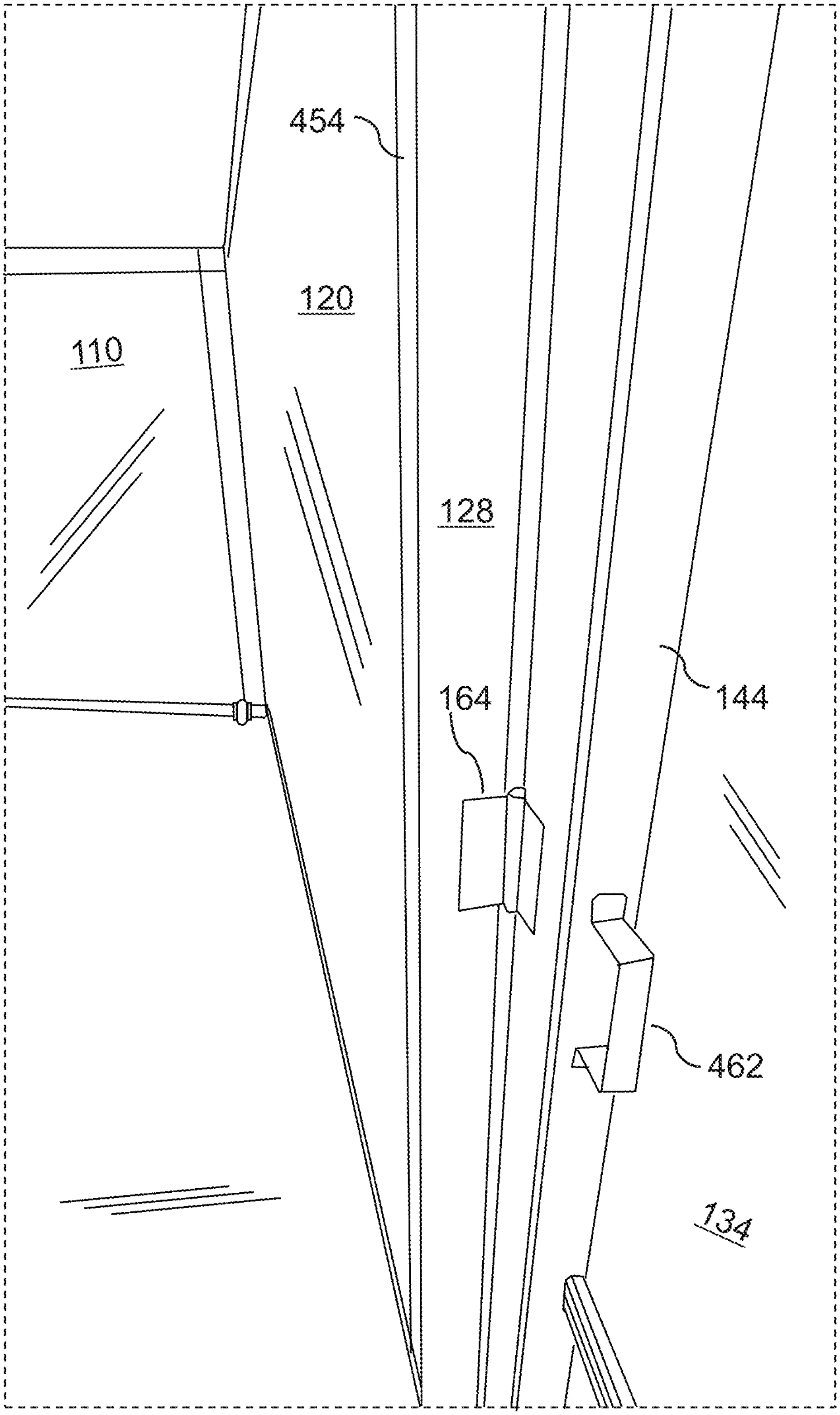
FIG. 4B is a right side perspective view of a portion of a safety enclosure building system in a folded-in configuration, according to an embodiment of the invention.

In another related embodiment, as shown in FIG. 4B, the safety enclosure building system 100 can further include:

a) at least one side handle 462, which is mounted on an outer vertical end of the vertical sliding column 144, of the safety enclosure building system 100;

such that the at least one side handle 462 can facilitate opening and closing of the safety enclosure building system 100.

In another related embodiment, as shown in FIG. 51), the safety enclosure building system 100 can further include:

a) a center flange 564, which is mounted to and protrudes along a rear side of an second inner vertical end 124 of the second wall panel 120 (or alternatively along a first inner vertical end 114 of the first wall panel 110), such that the center flange 564 is substantially flush with a rear surface of the second wall panel 120;

such that the center flange 564 is configured to overlap with the first inner vertical end 114 of the first wall panel 110, when the safety enclosure building system 100 is in the folded-out configuration;

whereby the center flange 564 closes any potential gap between the first wall panel 110 and the second wall panel 110 and thereby provides protection against potential projectile penetration into a safe interior 102, 902 of the safety enclosure building system 100, when the safety enclosure building system 100 is in the folded-out configuration.

Figure 4C:
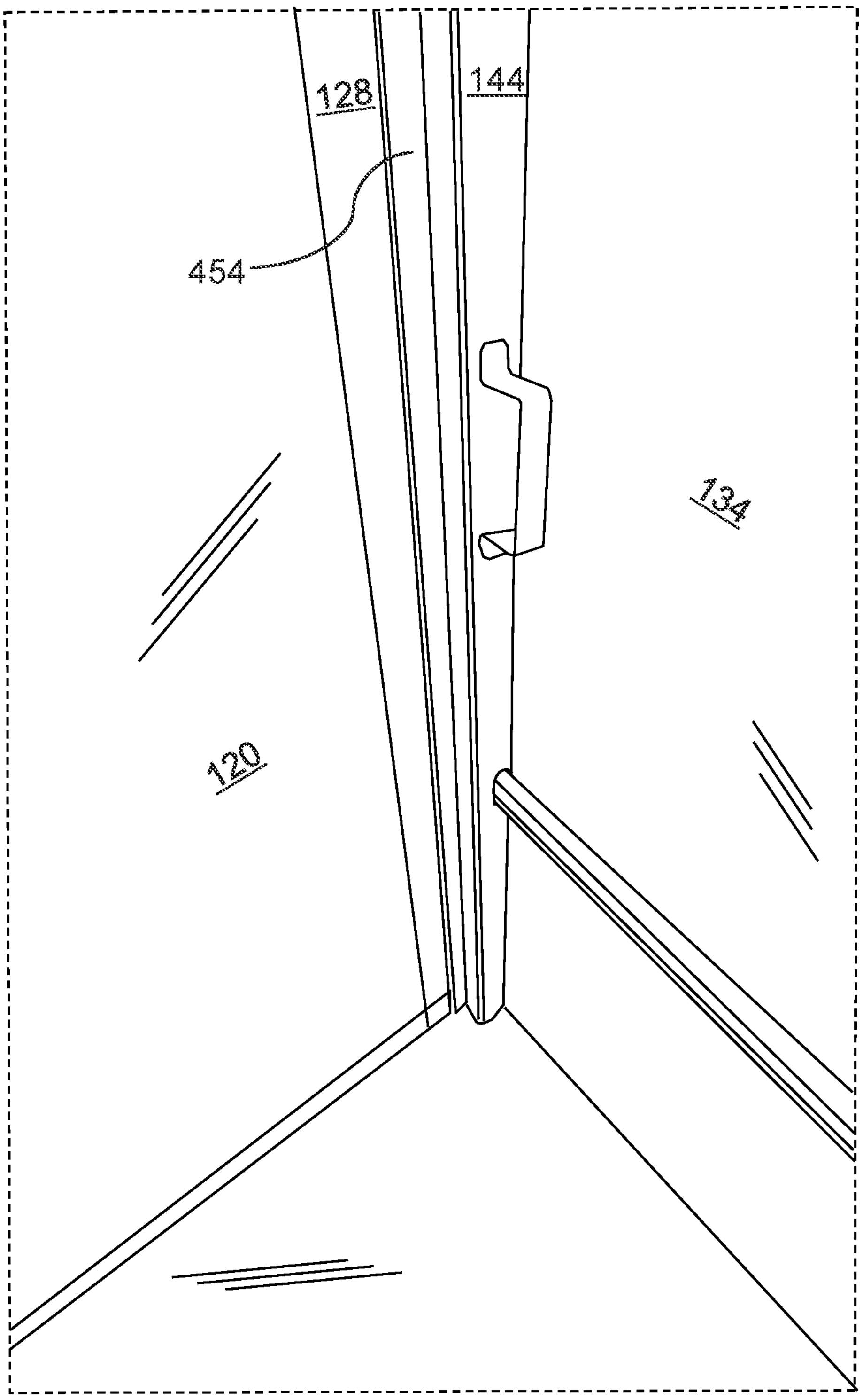
FIG. 4C is a right side perspective view of a portion of a safety enclosure building system in a folded-out configuration, according to an embodiment of the invention.

In yet another related embodiment, as shown in FIGS. 1A, 4B, and 4C, the safety enclosure building system 100 can further include:

a) at least one first outer hinge 162, which hingedly connects the vertical stationary column 142 with the first wall panel 110; and b) at least one second outer hinge 164, which hingedly connects the vertical sliding column 144 with the second wall panel 120.

In yet another related embodiment, as shown in FIGS. 1A, 1B, 4B, and 4C, the safety enclosure building system 100 can further include:

a) a first side flange 452, which is mounted and protrudes along a front side of the first outer vertical end 112 of the first wall panel 110, such that the first side flange 452 is substantially flush with a front surface of the first wall panel 110;

such that the first side flange 452 is configured to contact the vertical stationary column 142 (which alternatively can be a sliding column) when the safety enclosure building system 100 is in the folded-out configuration, such that the first side flange 452 hides and protects the at least one first outer hinge 162 (which hingedly connects the vertical stationary column 142 with the first wall panel 110); and b) a second side flange 454, which is mounted and protrudes along a front side of a second outer vertical end 122 of the second wall panel 120, such that the second side flange 454 is substantially flush with a front surface of the second wall panel 120;

such that the second side flange 454 is configured to contact the vertical sliding column 144 when the safety enclosure building system 100 is in the folded-out configuration, such that second side flange 454 hides and protects the at least one second outer hinge 164 (which hingedly connects the vertical sliding column 144 with the second wall panel 120), as shown in FIG. 4C;

such that the first side flange 452 and the second side flange 454 provide protection against potential penetration into a safe interior 102 of the safety enclosure building system 100, when the safety enclosure building system 100 is in the folded-out configuration.

In another related embodiment, as shown in FIG. 5E, the safety enclosure building system 100 can further include:

a) an inner stopper 512, which is mounted on an inner end of the at least one guide rail 152, such that the inner stopper 512 is configured to stop the at least one slidable connector 554, and thereby prevent the at least one slidable connector 554 from sliding off the inner end of the at least one guide rail 152; and b) an outer stopper 512, which is mounted on an outer end of the at least one guide rail 152, such that the outer stopper 512 is configured to stop the at least one slidable connector 554, and thereby prevent the at least one slidable connector 554 from sliding off the outer end of the at least one guide rail 152.

In another related embodiment, as shown in FIG. 5E, the safety enclosure building system 100 can further include:

a) an enclosure lock 510, which is configured to lock the safety enclosure building system 100 in the folded-out configuration;

such that the enclosure lock 510 is positioned to be accessible only from within the safe interior 102 of the safety enclosure building system 100;

wherein the enclosure lock 510 can be configured to lock the vertical sliding column 144 in position, such that the enclosure lock 510 engages between the vertical sliding column 144 and the second wall 134, to prevent sliding of the vertical sliding column 144 and thereby prevent movement of the safety enclosure building system 100;

wherein the enclosure lock 510 can be manual, such as a manual bolt lock as shown, or the enclosure lock 510 can be automatic such as via a spring-activated, bolt snap-lock mechanism, or an electronic locking mechanism.

In another related embodiment, as shown in FIG. 8, each of the first and second wall panels 110, 120 can further include:

a) an outer ballistic plate 812, which can be made from a stainless-steel alloy, other high-strength metal alloys or composite materials;

b) a ballistic material layer 814, which is configured to prevent penetration of a projectile;

c) a rigid foam insulation 816, which can be closed or open cell polyurethane foam; and d) an inner ballistic plate 818, which can be made from a stainless-steel alloy, other high-strength metal alloys or composite materials.

In a further related embodiment, the ballistic material layer 814 can be made from SPECTRA SHIELD II SR 3136™ ballistic material, manufactured by HONEYWELL™, which can ensure that the first and second wall panels 110, 120 can be certified to a NIJ Level III rating, as determined by the United States National Institute of Justice.

Figure 9:
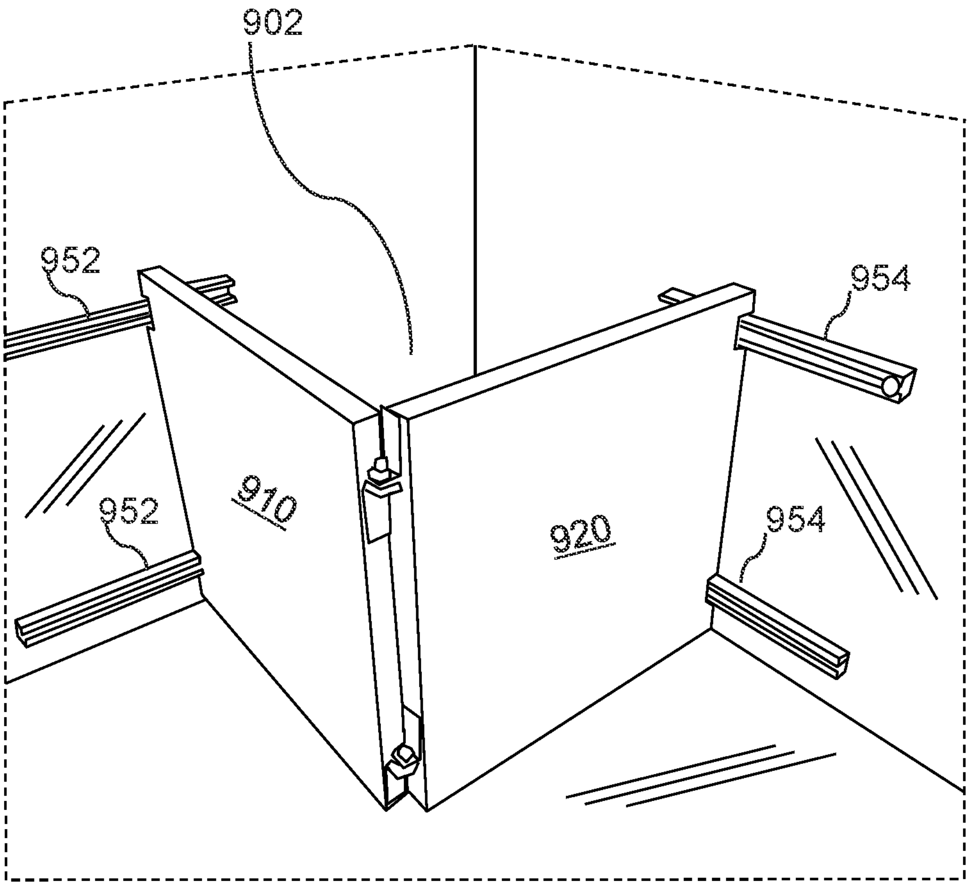
FIG. 9 is a perspective view of a safety enclosure building system in a fully folded-out configuration, according to an embodiment of the invention.

In an alternative embodiment of a safety enclosure building system 900, as shown in FIG. 9, outer ends of the first and second wall panels 910, 920 can each be slidably mounted on first guide rails 952 and second guide rails 954, respectively. In most cases the embodiment of the safety enclosure building system 100 shown in FIGS. 1A-1E may be most desirable for cost-saving and simplicity reasons, but the embodiment shown in FIG. 9 may be preferable for space saving reasons, to ensure sliding motion on both sides of the safety enclosure building system 900, which can reduce the sliding space needed for the second wall panel 920.

Figure 10:
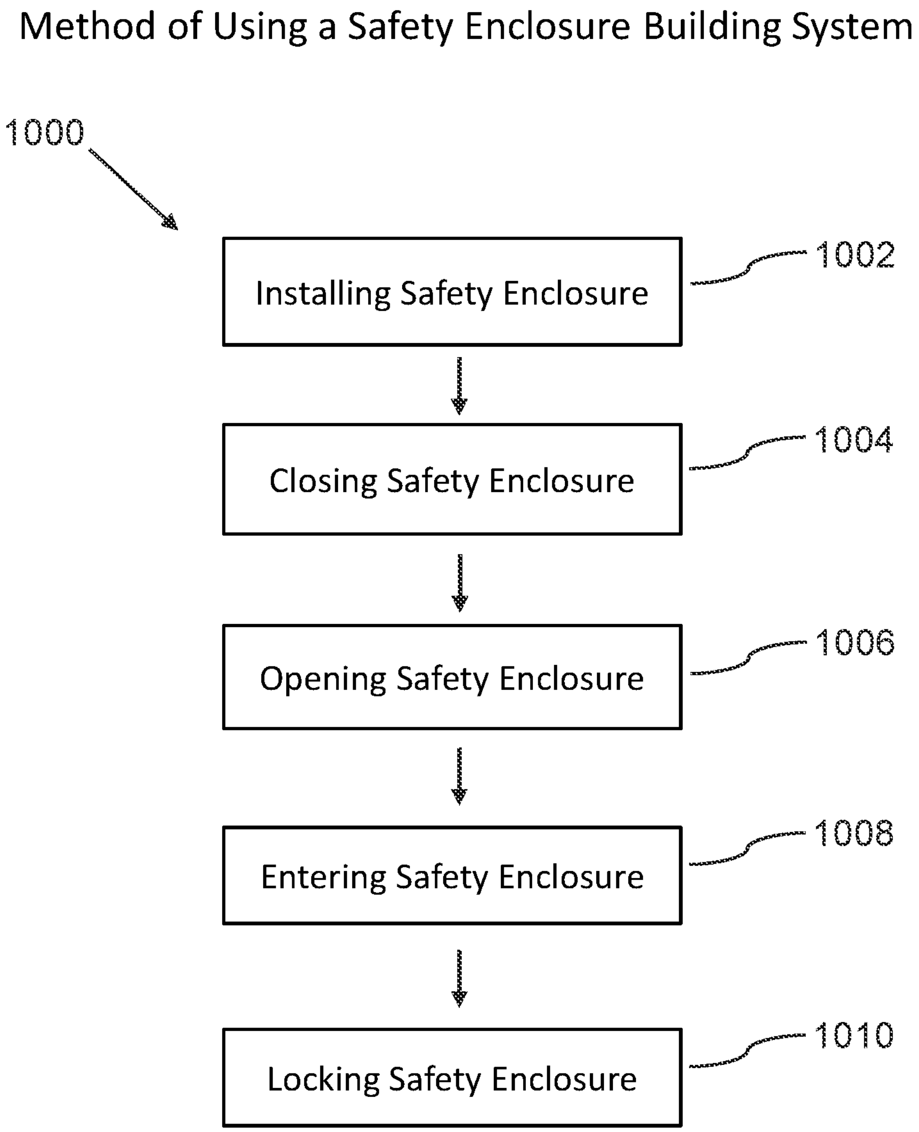
FIG. 10 is a flowchart illustrating steps that may be followed, in accordance with one embodiment of a method or process of using a safety enclosure building system.

In an embodiment, as illustrated in FIG. 10, a method 1000 of using a safety enclosure building system 100, can include:

a) Installing 1002 a safety enclosure building system 100 in an interior corner of a building 130;

b) Closing 1004 the safety enclosure building system 100, wherein first and second wall panels 110, 120 of the safety enclosure building system 100 are positioned in a folded-in configuration parallel to first and second walls 132, 134 of the building 130, respectively;

c) Opening 1006 the safety enclosure building system 100, such that the first and second wall panels 110, 120 of the safety enclosure building system 100 are positioned in a folded-out configuration (i.e. an open position), such that the safety enclosure building system 100 forms a safe interior 102, between the first and second wall panels 110, 120 and the first and second walls 132, 134;

d) Entering 1008 the safety enclosure building system 100, wherein at least one person 181, 182 enter the safe interior 102, through a door 174 in one of the first and second wall panels 110, 120; and e) Locking 1010 the safety enclosure building system 100, wherein (by the persons from inside the safe interior 102) the door 174 is locked and the first and second wall panels 110, 120 are locked in the folded-out configuration, to prevent intrusion into the safe interior 102 by a hostile person 190.

In various related embodiments, the safety enclosure building system 100 can provide various functional advantages, including:

a) Provide a non-intrusive ballistic "whiteboard" function;

b) Deploy in under 10 seconds;

c) Provide a ballistic shield for an entire class;

d) Can be customized to fit into any classroom;

e) Enable locking of door from the inside (teacher and administrator controlled);

f) Can enable activation of classroom cameras connected to monitor upon locking of the door;

g) Monitor can give teacher ability to know when it is safe to open the door;

h) Can enable law enforcement to know exactly where an active shooter is and confidently enter the school knowing children are out of harm's way; and i) Can be installed by trained and certified installers to ensure ballistic walls deploy effectively.

In various related embodiments, the safety enclosure building system 100 can be used in a variety of locations, including:

a) Schools;

b) After School and Tutoring locations;

c) Churches;

d) Office Buildings;

e) Judge's Chambers;

f) Public Transportation Centers; and g) Other Public and Private buildings and institutions.

Here has thus been described a multitude of embodiments of the safety enclosure building system 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A safety enclosure building system, comprising:

a) a first wall panel, wherein a first outer vertical end of the first wall panel is configured to be rotatably mounted to a first wall; and b) a second wall panel, wherein a second outer vertical end of the second wall panel is configured to be slidably and rotatably mounted to a second wall;

wherein the first wall panel and the second wall panel are each configured to prevent penetration of a projectile of a firearm;

wherein a first inner vertical end of the first wall panel is rotatably connected to a second inner vertical end of the second wall panel;

such that the safety enclosure building system is configured to be positioned in a folded-in configuration in a corner between the first wall and the second wall, such that the folded-in configuration permits space saving storage; and such that the safety enclosure building system is configured to be folded out to a folded-out configuration, such that the folded-out configuration can enable students to seek safety in a safe interior behind the safety enclosure building system.

2. The safety enclosure building system of claim 1, wherein each of the first wall panel and the second wall panel further comprises:

a) a panel assembly; and b) a frame assembly;

such that the panel assembly is supported by and held in place by the frame assembly.

3. The safety enclosure building system of claim 1, further comprising:

at least one whiteboard, which is mounted on an outer surface of a selected wall panel of the first wall panel and the second wall panel;

such that the at least one whiteboard is usable when the safety enclosure building system is positioned in the folded-in configuration.

4. The safety enclosure building system of claim 1, further comprising:

a) at least one guide rail, which is configured to be mounted on a surface of the second wall; and b) at least one slidable connector, which is connected to the at least one guide rail, such that the at least one slidable connector is configured to be slidable along the at least one guide rail;

wherein the second outer vertical end of the second wall panel is connected to the at least one slidable connector.

5. The safety enclosure building system of claim 4, wherein the at least one slidable connector further comprises:

a) a slider body; and b) a plurality of rotatable rollers, which are each rotatably connected to an inner side of the slider body;

wherein the at least one guide rail is configured with a cross-sectional c-shape, such that each rotatable roller in the plurality of rotatable rollers is configured to roll inside the at least one guide rail.

6. The safety enclosure building system of claim 4, further comprising:

an inner stopper, which is mounted on an inner end of the at least one guide rail, such that the inner stopper is configured to stop the at least one slidable connector, and thereby prevent the at least one slidable connector from sliding off the inner end of the at least one guide rail; and an outer stopper, which is mounted on an outer end of the at least one guide rail, such that the outer stopper is configured to stop the at least one slidable connector, and thereby prevent the at least one slidable connector from sliding off the outer end of the at least one guide rail.

7. The safety enclosure building system of claim 4, further comprising:

a vertical stationary column, which is connected to the first wall;

such that the first outer vertical end of the first wall panel is rotatably connected to the vertical stationary column; and a vertical sliding column, which is slidably connected to the at least one guide rail, such that the vertical sliding column is connected to the at least one slidable connector;

such that the second outer vertical end of the second wall panel is rotatably connected to the vertical sliding column.

8. The safety enclosure building system of claim 7, further comprising:

at least one first outer hinge, which hingedly connects the vertical stationary column with the first wall panel; and at least one second outer hinge, which hingedly connects the vertical sliding column with the second wall panel.

9. The safety enclosure building system of claim 8, further comprising:

a first side flange, which is connected to and protrudes along a front side of the first outer vertical end of the first wall panel, such that the first side flange is flush with a front surface of the first wall panel;

such that the first side flange is configured to contact the vertical stationary column when the safety enclosure building system is in the folded-out configuration, such that the first side flange hides and protects the at least one first outer hinge; and a second side flange, which is connected to and protrudes along a front side of the second outer vertical end of the second wall panel, such that the second side flange is flush with a front surface of the second wall panel;

such that the second side flange is configured to contact the vertical sliding column when the safety enclosure building system is in the folded-out configuration, such that second side flange hides and protects the at least one second outer hinge;

such that the first side flange and the second side flange provide protection against potential penetration into the safe interior of the safety enclosure building system, when the safety enclosure building system is in the folded-out configuration.

10. The safety enclosure building system of claim 7, further comprising:

an enclosure lock, which is configured to lock the safety enclosure building system in the folded-out configuration;

such that the enclosure lock is positioned to be accessible only from within the safe interior of the safety enclosure building system.

11. The safety enclosure building system of claim 10, wherein the enclosure lock is configured to lock the vertical sliding column in position, such that the enclosure lock is configured to engage between the vertical sliding column and the second wall, to prevent sliding of the vertical sliding column and thereby prevent movement of the safety enclosure building system when the safety enclosure building system is in the folded-out configuration.

12. The safety enclosure building system of claim 7, wherein a rear side of the vertical sliding column is configured with a cutout, such that the cutout is configured to receive the at least one guide rail, such that the vertical sliding column is configured to slide along the at least one guide rail, such that a rear vertical side of the vertical sliding column is adjacent to the second wall.

13. The safety enclosure building system of claim 7, further comprising:

at least one side handle, which is mounted on an outer vertical end of the vertical sliding column of the safety enclosure building system;

such that the at least one side handle is configured to facilitate opening and closing of the safety enclosure building system.

14. The safety enclosure building system of claim 1, further comprising:

at least one panel roller, which is mounted on lower end of a selected wall panel of the first wall panel and the second wall panel;

such that the at least one panel roller is configured to be rotatable, such that the at least one panel roller supports the selected wall panel during opening and closing of the safety enclosure building system.

15. The safety enclosure building system of claim 1, further comprising:

at least one central handle, which is mounted on a corresponding inner vertical end of a selected wall panel of the first wall panel and the second wall panel;

such that the at least one central handle facilitates opening and closing of the safety enclosure building system.

16. The safety enclosure building system of claim 1, further comprising:

at least one central hinge;

such that the first inner vertical end of the first wall panel is rotatably connected to the second inner vertical end of the second wall panel via the at least one central hinge, such that the first inner vertical end of the first wall panel is hingedly connected to the second inner vertical end of the second wall panel.

17. The safety enclosure building system of claim 1, further comprising:

a center flange, which is mounted to and protrudes along a rear side of the second inner vertical end of the second wall panel, such that the center flange is substantially flush with a rear surface of the second wall panel;

such that the center flange is configured to overlap with the first inner vertical end of the first wall panel, when the safety enclosure building system is in the folded-out configuration;

whereby the center flange closes any potential gap between the first wall panel and the second wall panel and thereby provides protection against potential projectile penetration into the safe interior of the safety enclosure building system, when the safety enclosure building system is in the folded-out configuration.

18. The safety enclosure building system of claim 1, wherein each of the first wall panel and the second wall panel further comprises:

an outer ballistic plate;

a ballistic material layer, which is configured to prevent penetration of the projectile;

a rigid foam insulation; and an inner ballistic plate.

19. The safety enclosure building system of claim 18, wherein each of the outer ballistic plate and the inner ballistic plate are made from a stainless-steel alloy.

20. The safety enclosure building system of claim 1, wherein the first outer vertical end of the first wall panel is configured to be slidably mounted to the first wall.

21. A method of using a safety enclosure building system, comprising:

a) installing the safety enclosure building system in an interior corner of a building;

b) closing the safety enclosure building system, wherein first and second wall panels of the safety enclosure building system are positioned in a folded-in configuration parallel to first and second walls of the building, respectively; and c) opening the safety enclosure building system, such that the first and second wall panels of the safety enclosure building system are positioned in a folded-out configuration, such that the safety enclosure building system forms a safe interior, between the first and second wall panels and the first and second walls.

22. The method of claim 21, further comprising:

entering the safety enclosure building system, wherein at least one person enters the safe interior, through a door in one of the first and second wall panels.

23. The method of claim 22, further comprising:

locking the safety enclosure building system, wherein the door is locked by the at least one person, such that the first and second wall panels are locked in the folded-out configuration, to prevent intrusion into the safe interior by a hostile person.

24. The method of claim 22, wherein the safety enclosure building system comprises:

a) the first wall panel, wherein a first outer vertical end of the first wall panel is configured to be rotatably mounted to the first wall; and b) the second wall panel, wherein a second outer vertical end of the second wall panel is configured to be slidably and rotatably mounted to the second wall;

wherein the first wall panel and the second wall panel are each configured to prevent penetration of a projectile of a firearm;

wherein a first inner vertical end of the first wall panel is rotatably connected to a second inner vertical end of the second wall panel;

such that the safety enclosure building system is configured to be positioned in the folded-in configuration in a corner between the first wall and the second wall, such that the folded-in configuration permits space saving storage; and such that the safety enclosure building system is configured to be folded out to the folded-out configuration, such that the folded-out configuration can enable students to seek safety in a safe interior behind the safety enclosure building system.

25. The method of claim 24, wherein the safety enclosure building system further comprises:

a) at least one guide rail, which is configured to be mounted on a surface of the second wall; and b) at least one slidable connector, which is connected to the at least one guide rail, such that the at least one slidable connector is configured to be slidable along the at least one guide rail;

wherein the second outer vertical end of the second wall panel is connected to the at least one slidable connector.

* * * * *